June 18, 1946.    F. L. CANTRALL ET AL    2,402,368
MOLD TURNOVER MECHANISM
Filed July 16, 1945    2 Sheets-Sheet 1

INVENTOR.
FORREST L. CANTRALL
JOHN A. CARLISLE
BY
ATTY.

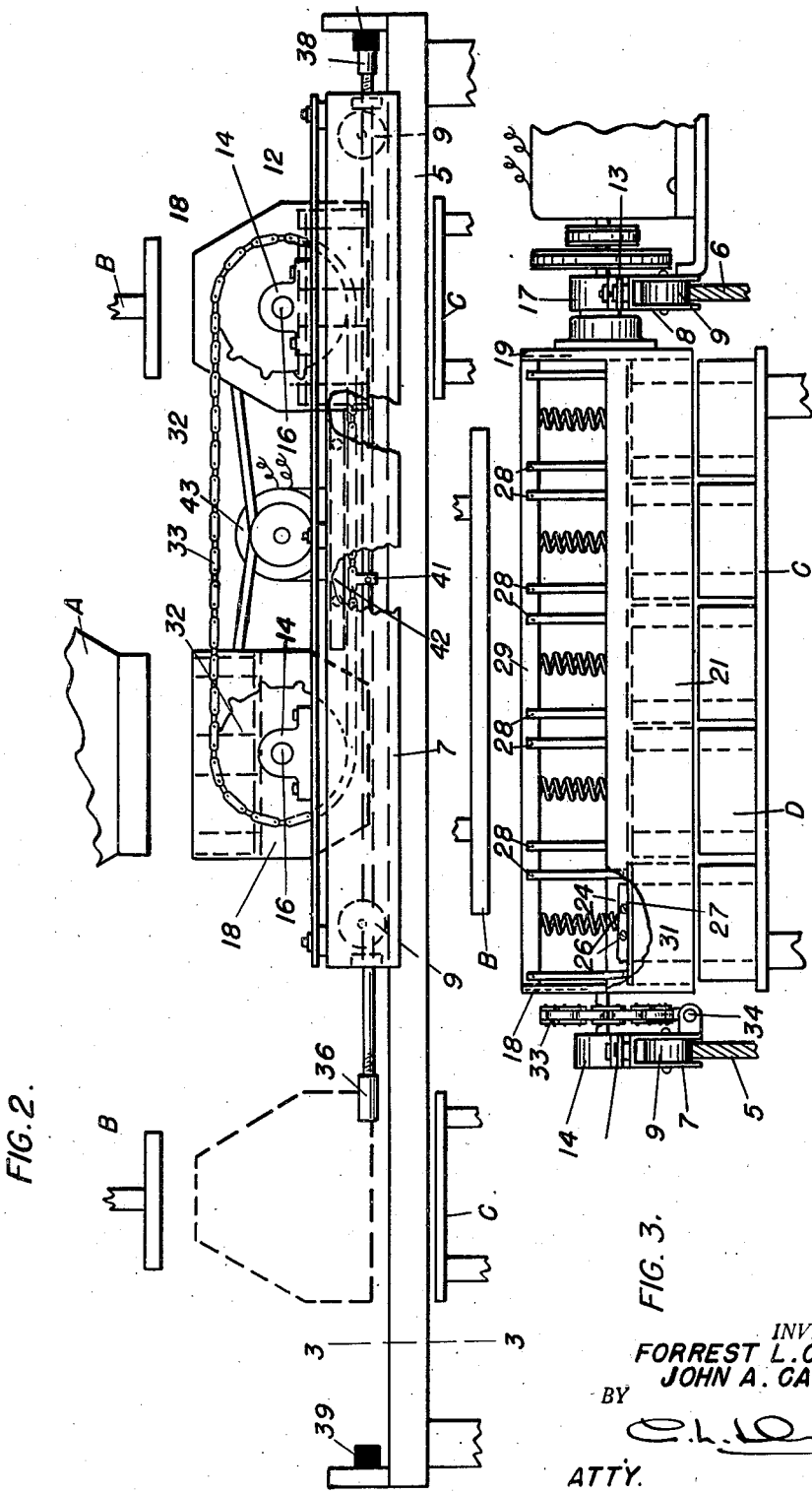

Patented June 18, 1946

2,402,368

UNITED STATES PATENT OFFICE 2,402,368

MOLD TURNOVER MECHANISM

Forrest L. Cantrall, Benicia, and John A. Carlisle, San Rafael, Calif.

Application July 16, 1945, Serial No. 605,294

3 Claims. (Cl. 25—41)

This invention relates to improvements in brick molding apparatus and has particular reference to a continuous molding procedure wherein while one mold is being filled, the other mold is being emptied.

The principal object of this invention is to provide an automatic arrangement for filling a mold, transporting the mold to a dumping position and ejecting the molded bricks from the mold, while at the same time a second mold is being filled ready for the transporting and dumping operation.

A further object is to produce a device of this character which is simple in construction, easy to operate and one which may be handled by an unskilled person.

A further object of this invention is to produce an apparatus which may be used with any standard form of mixer.

Other objects and advantages will be apparent during the course of the following description.

In the accompanying drawings forming a part of this specification and in which like numerals are employed to designate like parts throughout the same, Fig. 1 is a top plan view of a pair of brick molds and carriage.

Fig. 2 is a side elevation of Fig. 1; and

Fig. 3 is a cross-sectional view taken on the line 3—3 of Fig. 2.

Figure 1:
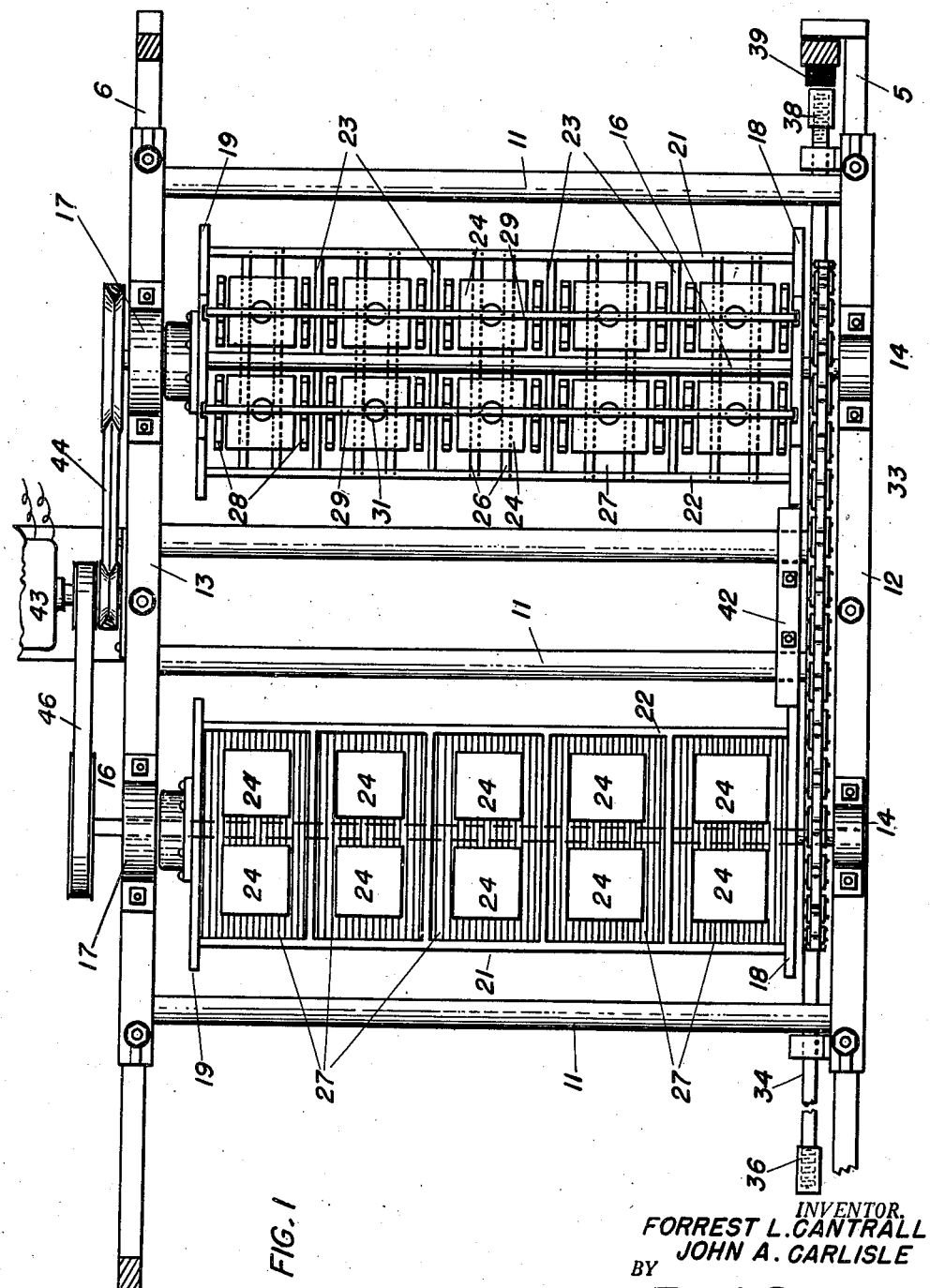

In the manufacture of bricks, and particularly pre-cast bricks, the speed in molding the bricks and ejecting them from the mold, so that the mold may be re-used, is an important feature in the economical production of the bricks.

We have, therefore, devised a molding apparatus wherein one mold is filled with a plastic material, vibrated to form a homogeneous mass, moved to a remote point, then turned over and the molded bricks ejected therefrom; while, at the same time, a second mold is being filled, vibrated and made ready for its turnover and ejection operation. Therefore, by having a continuous process, a large number of expensive molds are eliminated. Also, a much more uniform brick results for the reason that the automatic nature of the machine causes each brick to go through a definite cycle of operation, and if the mix is held uniform, then all bricks will be identical in composition.

In the accompanying drawings wherein for the purpose of illustration is shown a preferred embodiment of our invention, it will be noted that numerals 5 and 6 designate a pair of parallel-spaced rails upon which the mold-carriage may roll. This carriage consists of a pair of inverted U-shaped frame members 7 and 8, which straddle the rails 5 and 6 respectively, and serve to mount a plurality of wheels 9 which roll upon the rails 5 and 6. Rods 11 serve to space the U-shaped frame members and to thus complete the carriage for the molds.

Secured to the top of the U-shaped members 7 and 8 are flat spring-members, as shown at 12 and 13 respectively. These spring-members serve to support the molds and their bearings, and as both molds in the drawings are the same, but one will be described.

The bearing 14 is secured to the spring 12 and serves to rotatably support the mold-shaft 16 at one end while the bearing 17 supports this shaft 16 at its opposite end. The mold proper is made up of a pair of end plates 18 and 19 and a pair of side plates 21 and 22, thus forming a rectangular structure, which is further subdivided by cross plates 23, to form single bricks. In order to form hollow bricks we use core blocks, as shown at 24, which are supported by cross-rods 26.

In each brick section is positioned an ejector plate 27, which is connected by braces 28 to a push-rod 29, which push-rod is in turn supported by springs 31, which bears against the end of the cores 24. These ejector plates are thus slidably supported in the section and surround the core block.

A sprocket 32 is attached to each of the mold-ends 18 and a chain 33 reeved thereover, whereby movement of the chain will cause simultaneous rotation of the two molds about their shafts, and in order to cause this simultaneous rotation and at a definite period in the operation of the device, we attache to the side of the U-shaped frame member 7 a sliding rod 34, having adjustable ends 36 and 37, which are adapted to engage rubber bumpers 39 mounted at the ends of the rail 5. The rod 34 has a clip 41 which attaches it to the chain 33.

A stop 42 mounted on the center rods 11 acts to prevent a rotation of the mold beyond a certain distance. In Fig. 2 it will be noted that the right hand mold which is in dumping position is against the stop 42, and when the carriage moves toward the left until the left hand mold has been tipped, then it will in turn engage the opposite end of the stop 42. Thus, this stop serves to simultaneously position the two molds through the medium of the chain in either filling or dumping position.

A motor 43 serves to drive belts 44 and 46, which in turn drive pulleys on the mold shafts 16, which shafts in turn transmit vibration to each mold through a medium of a vibrator as described in our co-pending application filed on even date herewith.

The result of this construction is that we have devised an apparatus wherein a traveling carriage resiliently supports a pair of molds of the ejector type, which molds are connected together for simultaneous rotation about their supporting shafts, and means for effecting this simultaneous rotation of the molds during their movement from a position beneath a hopper to ejecting position, the hopper being shown at "A" and the ejecting plunger at "B." When the bricks are ejected they, in turn, rest upon tables, as shown at "C," the bricks being designated by "D."

It is to be understood that the form of our invention, herewith shown, and described, is to be taken as a preferred example of the same, and that various changes relative to the material, size, shape and arrangement of parts may be resorted to without departing from the spirit of the invention or the scope of the subjoined claims.

Having thus described our invention, we claim:

1. In a device of the character described, a pair of spaced parallel rails, a carriage movable on said rails, a pair of molds rotatably mounted on said carriage and in spaced parallel relation to each other, flexible means connecting said molds whereby said molds may be simultaneously rotated, and means connected to said flexible means whereby said flexible means will be actuated when said carriage moves a predetermined distance in either direction on said rails.

2. In a device of the character described, a pair of spaced parallel rails, a reciprocating carriage movable on said rails, means for limiting the movement on said carriage, a pair of molds rotatably mounted on said carriage, and means connected to said limiting means for rotating said molds on each reciprocation of said carriage.

3. In a device of the character described, a pair of spaced parallel rails, a reciprocating carriage mounted on said rails, resilient mold-supporting means mounted on said carriage, a pair of spaced molds rotatably mounted thereon, each of said molds having a sprocket secured thereto, and a chain extending between and over said sprockets, and a rod slidably mounted on said carriage and connected to said chain, whereby when said rod is moved lengthwise with respect to said carriage, said chain will cause simultaneous rotation of said molds.

FORREST L. CANTRALL.
JOHN A. CARLISLE.